Feb. 24, 1948.          C. C. CUTLER           2,436,380
              RAPID SWEEP RADIATING SYSTEM
                   Filed Sept. 23, 1944
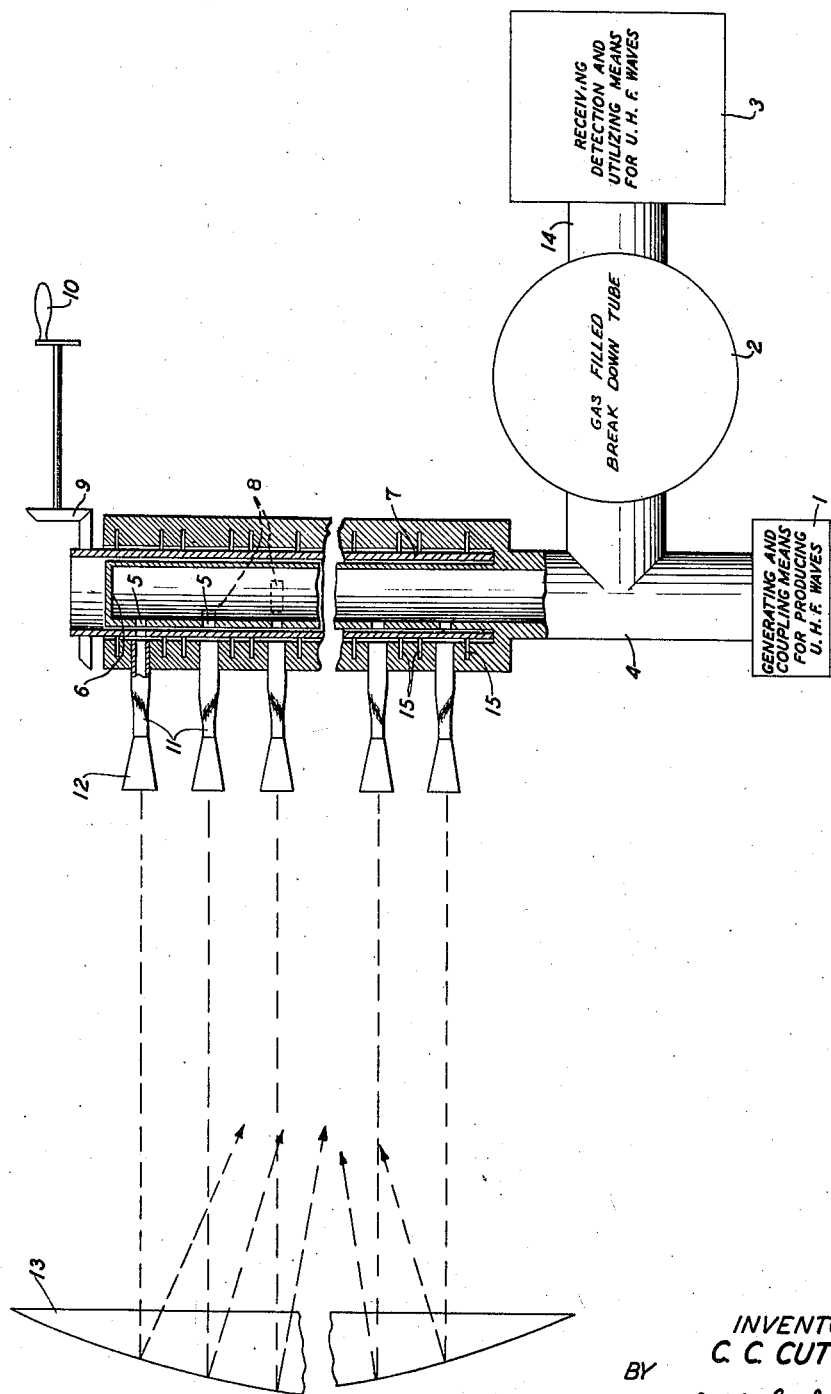
INVENTOR
C. C. CUTLER
BY
J. W. Schmied
ATTORNEY Patented Feb. 24, 1948

2,436,380

UNITED STATES PATENT OFFICE 2,436,380

RAPID SWEEP RADIATING SYSTEM

Cassius C. Cutler, Oakhurst, N. J., assignor to Bell Telephone Laboratories, Incorporated, New York, N. Y., a corporation of New York Application September 23, 1944, Serial No. 555,424

6 Claims. (Cl. 250—11)

This invention relates to ultra-high frequency radiated transmission.

An object of the invention is to conveniently and expeditiously change rapidly from one direction of transmission to another or rapidly in succession from one to another of a series of directions of transmission.

Let it be assumed that it is desired to sweep over a portion of the horizon with ultra-high frequency radiation in order to detect an object, for example, an iceberg, and indicate its direction or, for example, to locate and transmit to a distant receiving station, which upon receiving the radiated energy would transmit back and thereby establish communication or perhaps would only transmit back for the purpose of indicating the direction of the receiving station.

A further object of the invention is to provide a microwave transmission system for two-way communication between two stations constructed in accordance with an embodiment of the invention and between one such station and an equivalent station.

A feature of the invention comprises the utilization of receiving, detecting and utilizing means for ultra-high frequency waves which performs the dual purpose of checking the accuracy with which the radiated waves are transmitted to a desired cooperative receiving station and receiving wave energy sent back in the course of the two-way communication.

For these and other similar or analogous purposes the means, methods and apparatus characteristic of embodying or operating in accordance with the present invention might be utilized.

In accordance with an embodiment of the invention, there are provided instrumentalities comprising a main wave guide and a plurality of branch wave guides located along the main wave guide at intervals of one-half of the wavelength measured along the main wave guide. A rotating head forms a wave guide substantially continuous with the main wave guide and in rotating presents a series of helically arranged irises one after another to the branch wave guides to permit the energy to be transferred to these guides in succession. Alternate branch wave guides are twisted ninety degrees in opposite directions so that the energy issuing from their mouths which are slightly expanded into horns are identical in polarization and phase and this energy is made to impinge upon a paraboloid reflecting surface which causes the radiated energy to be directed backwardly past the wave guide structure into space.

The invention will be more readily understood from the accompanying drawings in the sole figure of which an embodiment of the invention is illustrated diagrammatically.

In the drawings certain known devices are illustrated in a purely diagrammatic manner. Among these are suitable generating and coupling means for producing ultra-high frequency waves, designated by rectangle 1, which comprise apparatus such as disclosed in either of the patents to Southworth 2,153,728, April 11, 1939, or Bowen 2,253,503, August 26, 1941, or its equivalent or the application of Samuel Serial No. 474,122, filed January 30, 1943, or equivalent apparatus; and the equipment designated by the apparatus 2, the general nature of which is hereafter described, which is similar to that disclosed in the application of Samuel Serial No. 474,122, filed January 30, 1943, or its equivalent; and receiving, detecting and utilizing means for ultra-high frequency waves indicated by the rectangle 3 which is in accordance with the application of Friis, Serial No. 474,164, filed January 30, 1943; the disclosures of these applications are incorporated herein by reference for all purposes and to the same extent as though they were set forth in full as a part hereof.

The apparatus 2 comprises, in general, a receiver-detecting arrangement and includes a gas-filled tube which breaks down under the influence of high energy transmitted waves, thereby preventing their energy from arriving at the apparatus 3 and destroying or impairing the said apparatus. The tube incorporated in the detecting apparatus 2 immediately becomes restored upon cessation of transmission to a condition wherein it freely transmits waves of low energy received from a distant transmitting station or reflected from a distant object and passes them on to the apparatus 3 by means of which they are detected and indicated. As indicated in the Samuel application aforesaid the apparatus 2 includes a resonant cavity and functions as a gas tube type switch.

The wave generating and coupling means 1 is associated with the main wave guide 4, which for horizontal sweeping may be considered to extend horizontally, by suitable equipment to cause the transmission through the guide 4 of ultra-high frequency waves of an order of wavelength in free space of from 1 centimeter to 100 centimeters of which 10 centimeters may be taken as a typical example. The upper part of the wave guide is terminated in a reflecting surface 6 and contains a plurality of irises 5 spaced along the guide longitudinally and in alignment at a longitudinal distance corresponding to one-half of the wavelength of waves within the guide. The first iris may be, for example, one-half wavelength, measured along the guide, from the reflecting surface 6. A rotating head 7 external to the guide contains a series of openings 8 which are arranged helically around the head in a uniformly spaced manner. The rotating head may be coupled to gearing 9 which may be operated by handle 10 or other manual or power driven means to rotate the head by remote control, if desired. In rotating the openings 8 are brought successively in front of the respective irises 5 to form a continuous opening directly from the main wave guide 4 into the respective branch wave guides 11 so that wave energy of, for example, waves of type $TM_0$, 1 (circular guide) traversing the main guide is converted into waves of type $TE_0$, 1 (rectangular guide) traversing the branch guides in succession. However, the scope of the invention is not restricted to any particular type or types of waves. Each branch guide terminates or may terminate in a small radiating horn 12 to cause its energy to impinge upon a paraboloid reflecting surface 13. The branch guides and the irises 5 are spaced by about one-half wavelength along the guide and each guide is twisted about 90 degrees, alternate twists being in opposite directions. In this way the wave energy from successive horns 12 is similar in phase and polarity. The radiating horns 12 are uniformly spaced from each other so that the wave energy issuing therefrom is caused to impinge upon the paraboloid surface so as to be reflected therefrom in a slightly different direction from the energy issuing from the adjacent radiated horn. If the horns are lined up in a horizontal direction, the resultant radiation will sweep over an arc in a horizontal direction; if the horns 12 are lined up in a vertical direction, the radiation will sweep over a vertical arc and if the horns are arranged in an inclined line, the radiation will sweep over an inclined arc. For the purposes of the following description it will be assumed that the horns are arranged in a horizontal direction. The energy issuing from each horn will be reradiated from the paraboloid surface in a fairly concentrated beam of greater or lesser dimensions. It may be assumed, for example, that if the energy at the center of the beam is of a definite intensity, the energy in a direction 1½ degrees from this will be reduced in amount by 50 per cent and it may, therefore, be assumed that the beam is effectively 3 degrees wide. Any convenient or suitable number of radiating horns may be provided. If we assume eight such horns, a total arc over which the various beams of variation will be transmitted will be approximately 24 degrees wide.

Let it be assumed that the rotating head 7 is stopped for the moment in front of one particular branch wave guide so as to direct radiating energy in a particular direction and that in said direction and lying within the beam is a reflecting object. Some wave energy will be reflected from the object to retraverse the path to the paraboloid surface 13, thence back to the particular wave guide from which the beam of energy is issuing and back to the main wave guide 4.

Let it be assumed that trains of ultra-high frequency oscillations, for example, of about 1 microsecond length per train, are being generated at intervals by the apparatus 1 and transmitted into the main wave guide 4, thence out through the branch wave guides one after another. After each energy train becomes effective upon the equipment 2, the gas tube comprised within such equipment breaks down and becomes substantially impervious to the passage of ultra-high frequency wave energy, thereby protecting the receiving and detecting equipment 3 from the effects of the relatively powerful transmitted waves. Upon the cessation of the train of ultra-high frequency waves, the gas-filled tube 2 resumes its normal condition which allows wave energy to be transmitted into the receiving wave guide 14. When this happens reflected wave energy arriving into the particular branch wave guide 11 from which the main wave train was transmitted becomes effective to operate the indicating equipment constituting a part of the devices 3. By rotating the head 7 at intervals by means of the crank 10 apparatus rotated, for example, on a ship can sweep over a portion of the horizon with the object of detecting any object, such as an iceberg, periscope or some other vessel the presence of which will be indicated by the indicating equipment of device 3 in a well-known manner. The devices 3 may include, for example, a cathode-ray tube having a fluorescent screen commonly used for detecting and indicating ultra-high frequency radiation. By utilizing the arrangement in the manner described, both the direction and distance of an object may be determined because the initial pulse of the transmitted wave energy will be received in the device 3 to a sufficient extent to give an indication on the screen and the time elapsing between this pulse and the return of the reflected wave may be determined in a well-known manner.

This equipment may also be used for two-way transmission. Thus, if we assume two stations similar to that described mounted on two ships, each operator may operate his scanning device until his transmitter is directed at the other ship whereupon he will receive an indication that the radiated beam is properly directed. The operator of the other ship will receive this beam on his receiver and upon cessation of transmission by the first transmitter the receiving transmitter may send out waves in reply. By keying the transmitters in a convenient manner the signals may be transmitted back and forth and each transmitter will have an indication that its outgoing waves are directed in a proper direction to impinge upon the cooperating receiver on the other ship. The receiving equipment of each station performs the dual purpose of checking upon the proper direction of transmission during the time one transmitter is transmitting and of receiving incoming wave energy from the other transmitter while its local receiver is inactive. Thus, a two-way signaling system is provided in which the stations transmit alternately at suitable intervals. If desired, however, both transmitters may transmit at the same time with the result that both the incoming and outgoing signals will appear upon the receiving screen or be indicated by some suitable indicating device. Inasmuch as the signals arriving from a cooperating transmitter of approximately equal power should and will be considerably greater in amplitude than those due to the reflected waves, there should be no difficulty in interpreting incoming signals during the time outgoing signals are being transmitted. There is thus provided not only a system in which transmission and reception may be carried on alternately but a system in which simultaneous two-way transmission and reception may be carried on and incoming signals delivered to the local transmitter. In the case of simultaneous transmission and reception, it will be obvious that if a wave train or a portion of a wave train is received into the equipment 2 at the precise instant when the tube comprised in that equipment is broken down to prevent passage of wave energy under the received wave guide 14, the received waves will not be indicated. This condition, however, does not prevent successful operation because trains of ultra-high frequency waves of relatively short duration may be transmitted at such successive intervals that the transmission time occupies but a small portion, that is, 1 per cent or $\frac{1}{10}$ of 1 per cent of the total time, thereby permitting reception during a large part of the total time. If the respective transmitters are so arranged that intervals between wave trains transmitted to them are somewhat different very few trains of waves will be lost. Consequently, if each successive signal, for example, if a total element of a Morse code is made to consist of a minimum of several successive groups of waves, no more than one group of waves per code element will be lost and successful reception may be accomplished. Thus, for example, if groups of waves are transmitted from one transmitter at intervals 0.01 second, groups of waves from the other transmitter at intervals of .011 second, and if each code element consists of a minimum of twenty-five groups of waves corresponding to approximately one-quarter of a second, it will invariably happen that a considerable number, perhaps twenty or more of each group of waves constituting a code element, will be successfully received. To this end the power supply of the generating oscillator may be keyed on and off in series with a suitable interrupter operating .99 second off and .01 second on or .989 second on and .011 second off as the case may be.

In order to prevent leakage of wave energy through the space between the extension of the main wave guide 4 and the rotating head 7 toroidal slots 15 which are one-quarter wavelength deep may be provided which act as a filter or impedance for filtering out waves tending to leak from one branch wave guide to another or tending to leak into free space instead of being transmitted through the branch wave guides and their respective horns.

What is claimed is:

1. A wave guide having a plurality of irises, supplemental wave guides, movable means for opening the irises in succession to said supplemental wave guides, and phase transforming means in each supplemental guide.

2. A rotating wave guide having a plurality of irises, a plurality of branch wave guides, movable means for opening the irises in succession to said branch wave guides, and means for equalizing the phase of wave energy issuing from the branch wave guides.

3. Wave guide apparatus comprising a hollow wave guide structure having a plurality of openings arranged longitudinally along the wall thereof, a structure rotatable with respect thereto having a similar plurality of openings arranged in the wall thereof, and means for driving said structures with respect to one another so as to align said openings in successive pairs, one in each structure.

4. Wave transducing apparatus comprising a main transmission wave guide, branch guides having energy inlet openings, iris means for coupling the openings of said branch guides to said main transmission guide, and wave trap means for reducing cross transfer of energy from one of said openings to another.

5. A series of wave guides, means for supplying an electromagnetic wave of a given frequency and mode to corresponding ends of said guides of said series in a succession of phases progressing serially along the series of guides, radiating structures at the respective other ends of said guides, and polarity transforming means included in the guides whereby waves issuing from the radiating structures are similar in phase and polarity.

6. An electromagnetic wave transducing structure comprising a hollow pipe having a plurality of wave conductive openings in the wall thereof arranged in helical relation, a second hollow pipe structure coaxial with said hollow pipe structure having iris openings in the walls thereof, and means for rotating one of said pipes with respect to the other to cause said conductive openings and said iris openings to become aligned in pairs successively for the transfer of electromagnetic wave energy through said pairs of openings in succession.

CASSIUS C. CUTLER.